US008012242B2

(12) United States Patent
Kozliak et al.

(10) Patent No.: US 8,012,242 B2
(45) Date of Patent: Sep. 6, 2011

(54) ADSORBENT MEDIATED REDUCTION OF ORGANIC CHEMICALS FROM SOLID BUILDING MATERIALS

(75) Inventors: Evguenii I. Kozliak, Grand Forks, ND (US); Wayne S. Seames, Grand Forks, ND (US)

(73) Assignee: The University of North Dakota, Grand Forks, ND (US)

( * ) Notice: Subject to any disclaimer, the term of this patent is extended or adjusted under 35 U.S.C. 154(b) by 219 days.

(21) Appl. No.: 11/897,758

(22) Filed: Aug. 31, 2007

(65) Prior Publication Data

US 2008/0110566 A1 May 15, 2008

Related U.S. Application Data

(60) Provisional application No. 60/824,174, filed on Aug. 31, 2006.

(51) Int. Cl.
*A62D 3/30* (2007.01)
*B01D 53/02* (2006.01)

(52) U.S. Cl. .................... 95/141; 422/186.3; 204/157.3; 52/741.1

(58) Field of Classification Search . 95/90; 204/157.15; 588/313, 316, 400, 405, 406
See application file for complete search history.

(56) References Cited

U.S. PATENT DOCUMENTS 4,028,261 A * 6/1977 Petersen et al. ................. 134/42
4,149,023 A * 4/1979 Mizuno et al. .................. 96/126
4,386,004 A * 5/1983 Jenkins ......................... 510/240
5,604,339 A * 2/1997 Tabatabaie-Raissi et al. .......................... 204/157.3
5,678,238 A 10/1997 Billings et al.
6,645,307 B2 * 11/2003 Fox et al. .......................... 134/6
6,699,577 B2 * 3/2004 Nonoyama et al. ........... 428/323
6,809,145 B1 * 10/2004 Okamura et al. ............. 524/497
7,144,725 B2 12/2006 Kozliak et al.
2002/0182334 A1 * 12/2002 Marzolin et al. .............. 427/421
2004/0073078 A1 * 4/2004 Osada et al. .................. 588/213
2004/0198625 A1 * 10/2004 Mckechnie et al. .......... 510/302
2005/0191132 A1 * 9/2005 Terrel et al. .............. 405/129.45
2006/0207870 A1 9/2006 Kozliak et al.
2006/0276360 A1 * 12/2006 Muradov ...................... 510/240
2006/0276361 A1 12/2006 Bullis et al.
2007/0023641 A1 * 2/2007 Weitz ............................ 250/288

OTHER PUBLICATIONS

Cussler, E.L., *Diffusion: Mass Transfer in Fluid Systems*, New York: Cambridge University Press, pp. 28-35; 49; 101-141, (1997).
Burnes, T.A., et al., "Bacterial Biodegredation of Extractives and Patterns of Bordered Pit Membrane Attack in Pine Wood," from *Applied and Environmental Microbiology*, vol. 66, No. 12, pp. 5201-5205 (Dec. 2000).
Kumar, R., et al., "Porosity, pore size distribution and in situ strength of concrete," from *Cement and Concrete Research*, 33, pp. 155-164 (2003). Kealyer, D., et al., "Instant Notes: Analytical Chemistry," Bios Scientific Publishers(Oxford, UK), pp. 122-123 (2002).
Tsuchikawa, S., et al., "Near-Infrared Spectroscopic Monitoring of the Diffusion Process of Deuterium-Labeled Molecules in Wood. Part I: Softwood," from *Applied Spectroscopy*, vol. 57, No. 6, pp. 667-674 (2003).
Siau, J., *Wood: Influence of Moisture on Physical Properties*, Dept. of Wood Science and Forest Products Virginia Polytechnic Inst. and State University, pp. 26-28, (1995).
Taylor, H., *Cement Chemistry*, $2^{nd}$ Ed., pp. 234-237, (1997).

* cited by examiner

*Primary Examiner* — Duane Smith
*Assistant Examiner* — Christopher P Jones
(74) *Attorney, Agent, or Firm* — Kinney & Lange, P.A.

(57) ABSTRACT

A method of removing pollutants from building materials using an externally applied adsorbent. The adsorbent has a high affinity to common pollutant chemicals. The pollutants are transferred from the contaminated microporous building materials onto the adsorbent until sufficient amounts of pollutant chemicals are reduced to make the building materials acceptable and safe to use. The adsorbent may be regenerated and reused or treated as a waste.

13 Claims, 4 Drawing Sheets

ADSORBENT MEDIATED REDUCTION OF ORGANIC CHEMICALS FROM SOLID BUILDING MATERIALS

CROSS-REFERENCE TO RELATED APPLICATION(S)

This application is a non-provisional of provisional application Ser. No. 60/824,174, filed Aug. 31, 2006.

STATEMENT OF GOVERNMENT INTEREST

This invention was made with government support under Contract No. 05-JV-1111120-102 awarded by the United States Department of Agriculture. The government has certain rights in the invention.

BACKGROUND

Fuel oil spills resulting from storage tank leaks, overfills, or catastrophic floods may pose a sizable risk to human health. Hydrocarbons (and other chemicals spilled during the flood/hurricane) get entrapped along with water inside the pore spaces of solids thus forming so called “ganglia”, a three-dimensional network of pores filled with a mixture of chemicals and water. This problem emerged after a catastrophic flood that occurred in Grand Forks, N. Dak. in April 1997. During the flood, a number of fuel oil tanks in residential basements were ruptured and the spilled hydrocarbons mixed with water and were absorbed into the concrete walls of the basements as well as into wooden flooring and first floor framing wood. Afterward, slow evaporation exposed residents to hydrocarbon vapors, which lasted for years. The residual vapor concentration in some residence basements was high enough that the EPA condemned the houses, resulting in their total destruction.

Porous, solid materials such as concrete, wood, gypsum, brick and like materials can become contaminated with semivolatile organic chemicals which pose a sizeable risk to human health. Semivolatile organic chemicals, such as fuel oil, diesel, and other transportation fuels, come in contact with and can be absorbed into porous, solid materials, typically as a result of spills, leakage, and/or catastrophic floods. Other sources of contaminating semivolatile organic chemicals include household chemicals, solvents, pesticides, herbicides, insecticides, and other industrial chemicals that can be absorbed into porous materials due to commercial, industrial or home use. Semivolatile organic chemicals can also be absorbed into porous materials due to intentional acts of sabotage where these organic chemicals are used as chemical warfare agents or delivered in conjunction with other chemical warfare agents.

Unfortunately, common remediation techniques, such as heating and pump-and-treat technologies, prove to be inefficient for the removal of semi-volatile organic chemicals from concrete and wood. For example, heating causes pollutants to penetrate deeper within concrete blocks, which inhibits remediation and merely delays the release of the organic vapors into the ambient air. Treating surfaces with soap also does not work in this application. Surfactants can not reach the organic chemicals trapped in the ganglia and thus are not effective in causing these chemicals to be removed from the material.

The problem is not limited to hydrocarbons and/or floods. For instance, military munitions production and storage facilities may be heavily contaminated with hazardous explosives and the by-products of their manufacture, such as trinitrotoluene (TNT) and 2, 4-dinitrotoluene (DNT). Common remediation techniques have been shown to be ineffective in these applications as well.

It is evident that there is a compelling need for an efficient method of removing organic chemicals from the pore spaces of monolith-type solids. The present invention demonstrates how an externally applied adsorbent can be used to reduce the amount of semi-volatile organic chemicals absorbed into porous, solid materials upon application of the applied adsorbent to the surface of the building materials.

SUMMARY

A method of removing pollutants from pores of solid monolith-type materials has been discovered and developed. The method consists of contacting a significant amount of an adsorbent with a high affinity for at least one pollutant to a surface of the porous, solid material to be treated. Contact is maintained until sufficient semi-volatile organic chemicals are removed to make the building materials acceptable. In the event that a single application is insufficient for complete removal of the pollutant chemical(s) to safe levels, a second application of a new batch or renewed batch of the adsorbent is applied. This process is then repeated until the pollutant chemical(s) has been removed to safe levels. An alternative of the process involves using either batch or sequential application of multiple quantities of adsorbent for the removal of multiple pollutant chemicals.

In the present invention a method is described wherein adsorbents are applied to porous, solid materials that include microporous building materials, such as wood, and nanoporous building materials, such as concrete. The present invention is designed to take advantage of this finding through the following aspects:

In the first aspect of the invention, a method of reducing the amount of semivolatile organic chemicals contained in porous, solid material is performed by applying an adsorbent on the surface of a solid material.

In the second aspect of the invention, semivolatile organic chemicals are organic chemical compounds having a vapor pressure of less than 400 Pa at room temperature, and more preferably, vapor pressure of less than 200 Pa, 100 Pa, 50 Pa and 10 Pa. Chemical compounds include, but are not limited to, fuel oil/diesel/kerosene hydrocarbons (such as hexadecane), oxygenated compounds (such as diethyl phthalate), polychlorobiphenyls, halogenated compounds (such as DDT, chlordane, chlorinated dioxins and dibenzophanes), and nitrocompounds (such as DNT, nitroglycerin, nitrotoluene or trinitrotoluene).

In the third aspect of the invention, porous, solid materials include those materials used in building and construction. More preferably, porous solid materials include concrete, wood, lumber, gypsum, brick, masonry, asphalt, cement, cinder, tile, drywall and like materials.

In the fourth aspect of the invention, the porous solid materials can be either “dry” or “wet”.

In the fifth aspect of the invention, the “wet” porous materials can be either “fresh” or “aged”.

In the sixth aspect of the invention, adsorbents are those biological substances that include, but are not limited to: charcoal, activated carbon, clays, diatomaceous earth, zeolites, and silica.

In the seventh aspect of the invention, the adsorbent is in contact with the porous, solid material for at least 6 hours or longer. More preferably, the adsorbent is in contact for at least 12 hours, 24 hours, 2 days, 1 week, or longer. In some cases, the adsorbent is in contact for at least 2 weeks or longer.

In the eighth aspect of the invention, upon application of an adsorbent material, the concentration of semivolatile organic chemicals absorbed in the porous, solid material are reduced by at least 10%, and more preferably by at least, 20%, 40%, 60%, 80%, 90% or greater.

In the ninth aspect of the invention, the temperature is between 5° C. and 40° C.

In the tenth aspect of the invention, the adsorbent application is used as a pre-treatment prior to the application of chemical, photochemical, or biological methods.

In the eleventh aspect of the invention, the adsorbent application is used as a post-treatment following the application of chemical, photochemical, or biological methods.

In the twelfth aspect of the invention, the adsorbent application contains a photocatalyst or biomass.

DETAILED DESCRIPTION

Figure 1:
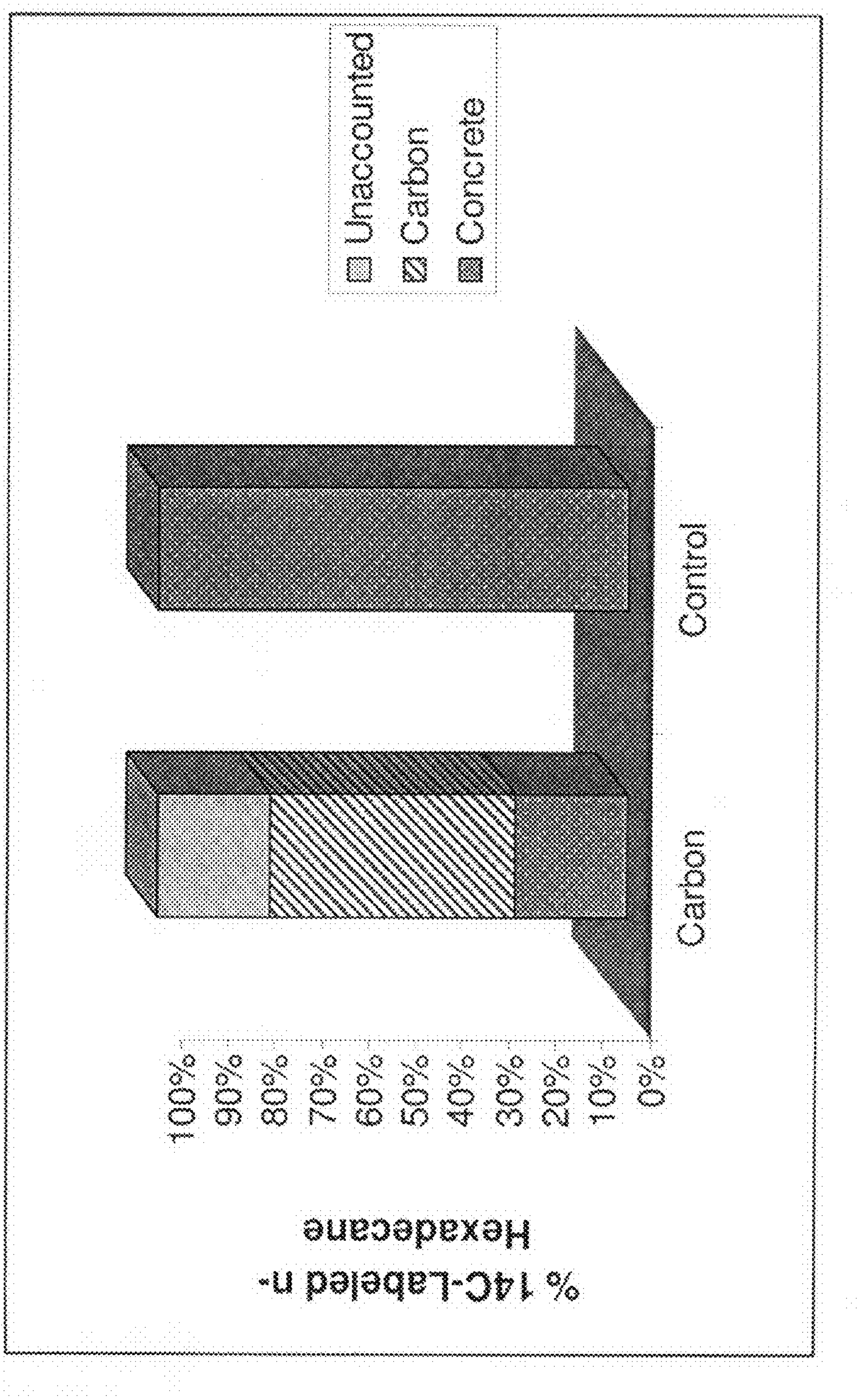
FIG. 1 summarizes the removal of $^{14}C$-labeled n-hexadecane from freshly contaminated ambient and water-inundated concrete samples by application of untreated powdered activated carbon (including the mass balance).

In order to accurately clarify the invention, the following terms have the following associated meanings:

"Semivolatile organic chemicals" means those organic chemical compounds containing at least one carbon to carbon bond and having a boiling point greater than 250° C. with a corresponding vapor pressure of less than 400 Pa at room temperature. They do not volatilize immediately upon contamination of the building material yet they volatilize slowly thus contaminating the indoor air over the course of many years.

"Porous, solid material" means those materials that have a structure such that semivolatile organic chemicals applied to the surface of that material may diffuse through the opening or pores in the structure into the interior of the material. The pores must be present in a unified quantity of the material as opposed to being the result of void spaces located between multiple unified quantities of the material, whereby the pore sizes of the material are less than 1 micrometer. The pore size of mature concrete is between about 0.003 micrometers, i.e., nanopores and 0.1 micrometers, i.e. micropores (H. F. Taylor, Cement Chemistry, 2nd Ed. T. Telford, London, 1998). The pores of wood are larger, but they periodically narrow down to only about 0.2 micrometers, forming pointed end pores (J. Siau, *Wood: Influence of Moisture on Physical Properties*, Springer Verlag, Berlin, 1995; Tsuchikawa S. and H. W. Siesler, Applied Spectroscopy, 2003, 57, 667-674; T. A. Burnes, R. A. Blanchette, and R. L. Farrell, Applied and Environmental Microbiology, 2000, 66, 5201-5205).

"Partitioning" means a distribution of a chemical between different phases according to the corresponding thermodynamic equilibrium.

"Adsorption" means partitioning onto the surface of an adsorbent whereas absorption is partitioning into the bulk (D. Kealyer and P. J. Haines, *Instant Notes: Analytical Chemistry*, BIOS Scientific Publishers, Oxford, UK 2002).

"Molecular-scale diffusion" (often called simple diffusion or diffusion) is random motion of molecules preferential in the direction of the concentration gradient (Cussler, E. L., *Diffusion: Mass Transfer in Fluid Systems* (pp. 28-35, 101-141). New York: Cambridge University Press, 1997). Unlike flow diffusion which can be much faster, molecular-scale diffusion in liquids and solids is slow; the typical values of diffusion coefficients are on the order of $10^{-10}$ $m^2/s$. It is even slower, by several orders of magnitude, within the network of pores of solid materials (J. Siau, *Wood: Influence of Moisture on Physical Properties*, Springer Verlag, Berlin 1995).

"Dry" samples refer to samples that have been soaked in a beaker of a contaminant.

"Wet" samples refer to samples that have been soaked in a beaker of a contaminant and submerged in distilled water for 3 hours.

"Aged" samples mean samples that have been soaked in a beaker of a contaminant for a period of 10 days.

"Fresh" samples mean samples that have been soaked in a beaker of a contaminant for a period of 1 day.

"Photocatalyst" means those chemical substances, which in the presence of an ultraviolet light source of appropriate wavelength and intensity, will facilitate a chemical reaction between two or more chemical compounds. Whereby "facilitate" means that the overall reaction rate is at least twice as fast as the overall reaction rate in the absence of either the photocatalyst or the appropriate ultraviolet light source.

"Biomass" means pre-grown microbial cells, either grown as suspended in a liquid aqueous medium or attached on a solid medium (agar).

In the present invention, a method is described wherein adsorbents are applied to porous, solid materials that include microporous building materials, such as wood, and nanoporous building materials, such as concrete, and diffusion of the substantially non-vaporized pollutant (semivolatile organic chemicals) from the interior of the solid material to the surface to enable partitioning of the pollutant in the adsorbent is allowed, resulting in the reduction of pollutant concentration within the material treated. Contact is maintained until sufficient semivolatile organic chemicals are removed to make the building materials acceptable; this usually requires a few days because sufficient time should be allowed for the contaminant(s)' molecular-scale diffusion from the pores of the building material toward the surface for partitioning with the adsorbent.

Although adsorbents have been commonly used to remove pollutants from liquids or gases, the application of these materials to porous, solid materials has not been previously used to reduce the level of chemical contaminants of these materials. The method appears to be effective for both "aged" building materials that have been exposed in excess of one week and "fresh" materials that have been recently exposed. It is well-known to those skilled in the art that methods of extraction of adsorbed chemicals may be ineffective or virtually ineffective for "aged" samples. This effect is particularly pronounced for samples contaminated with poorly water-soluble chemicals inundated with water.

The low temperature and/or low moisture level in the treatment room may be significant for the success of the treatment. A dehumidifier-type apparatus and/or air conditioner could be operated. Generally, the temperature range should be kept between 5° C. and 40° C.

The length of time needed for pollutant removal varies depending on the amount and characteristics of the pollutant, the composition of the contaminated structure, and which embodiment of the present invention is used. Generally, the process will require about one week to two months.

Once the desired amount of pollutant is removed from the contaminated structure, the adsorbent material and support, if applicable, is removed, and the structure is cleaned with detergent and water.

Other remediation techniques use adsorptive materials, such as charcoal, for the removal of contaminants from porous surfaces, particularly concrete and asphalt. However, this proposed process only deals with the removal of contaminants from the surface of the concrete, and does not address contaminant removal from deep within its pores (U.S. Patent Publication No. 2006/0276361).

Remediation techniques for the removal of contaminants from porous surfaces using photocatalysts (U.S. Patent Publication No. 2006/0207870) and biomass (U.S. Pat. No. 7,144,725) have been previously discussed.

EXAMPLE 1

Contamination Procedure

Concrete samples were fragmented from a single standard 3000 psi concrete tile manufactured at Concrete, Inc (Grand Forks, N. Dak., U.S.A.). Wood samples were commercial-grade Southern Yellow Pine purchased from Menards (Grand Forks, N. Dak., U.S.A.), and all chemicals used were reagent grade. $^{14}C$-labeled n-hexadecane and DNT were purchased from Sigma and American Radiolabeled Chemicals (St. Louis, Mo.), respectively. All chemicals, solutions, and tools were steam-sterilized by autoclaving for one hour at 2.5 atm and the experiments were conducted in the dark to eliminate the possibility of potential bio- and photo-remediation.

Scintillation counting was performed on a Beckman 6800 counter in plastic vials using 5 mL of Econo-safe scintillation cocktail (Research Products International, Mount Prospect, Ill., U.S.A.).

Each piece of concrete was contaminated by adding 30 µL of $^{14}C$-labeled n-hexadecane to its surface, wrapping in aluminum foil and storing under a fume hood at room temperature. Incubation period was 10 days for "aged" samples and 1 day for "fresh" samples. For creating "wet" samples, following the contamination, the samples were submerged in distilled water for 3 hours. The control sample in FIG. 1 demonstrated that this process results in concrete contaminated with n-hexadecane. Dry activated carbon was prepared by 2-hour pre-heating in an oven at 110° C. unless otherwise noted.

EXAMPLE 2 n-Hexadecane Removal via Activated Carbon on Fresh Concrete

Activated carbon was applied to "wet" or "dry" contaminated pieces of concrete for different times ranging from one, seven, fourteen, or twenty-one days. After this time concrete samples were crushed into powder using a hammer and were placed in 22 mL vials.

The $^{14}C$-labeled n-hexadecane present in concrete was extracted as follows: 10 mL of ethyl acetate per 1.5 g piece of crushed concrete was incubated on a rotary shaker for more than 80 hours. This was followed by using a second extracting solvent, n-pentane. $^{14}C$-labeled DNT present in wood or concrete was extracted by acetonitrile using a similar procedure. Complete extraction was verified by scintillation counting.

To analyze the amount of $^{14}C$-labeled contaminant in the adsorbent, the spent activated carbon was extracted with an appropriate solvent and an aliquot was taken for scintillation counting. The procedure of extraction from carbon was carried out using the Soxhlet extraction. Contaminated carbon was placed inside a cellulose thimble (Whatman, 25*90), which was loaded into the Soxhlet extractor. The extractor was attached to a condenser and 250-mL round bottom flask containing 100 mL of the extraction solvent (pentane). The solvent was heated to achieve boiling and evaporation into the extraction chamber. The chamber filling rate was 10 cycles per hour. Extraction was carried out for 24 hours. Then, the extracted solution was cooled at room temperature and concentrated by evaporation to a measured volume (approximately 20 mL) on a rotavapor. An extraction efficiency of 92-96% was achieved for all activated carbon samples.

FIG. 1 shows the distribution of $^{14}C$-labeled n-hexadecane in an adsorbent (untreated activated carbon) that was applied to fresh hexadecane-contaminated concrete, whereby the adsorbent was applied as a thin coat to the contaminated side. As shown, the non-treated activated carbon can be used for the efficient removal of pollutants, specifically hydrocarbons such as n-hexadecane, from freshly contaminated concrete.

EXAMPLE 3 n-Hexadecane Removal via Activated Carbon Adsorption on Fresh and Aged Wet Concrete Samples Inundation of the contaminated concrete with water or aging contaminated samples for 10 days significantly reduces the efficiency of the hydrocarbon removal. To compensate for this drop in efficiency, the activated carbon is pre-heated prior to application.

Figure 2:
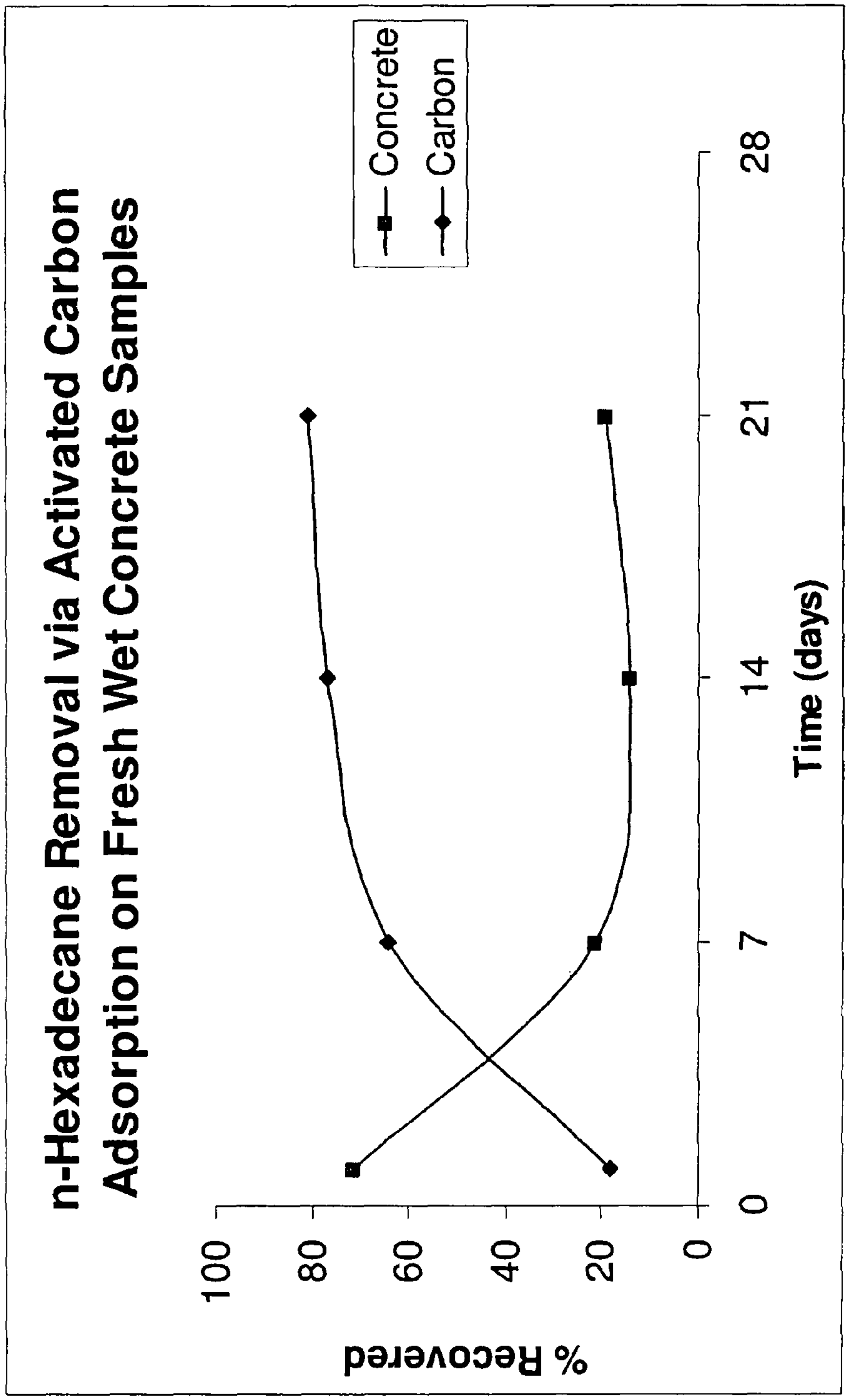
FIG. 2 summarizes the removal of $^{14}C$-labeled n-hexadecane from fresh wet concrete samples by application of pre-heated activated carbon.
Figure 3:
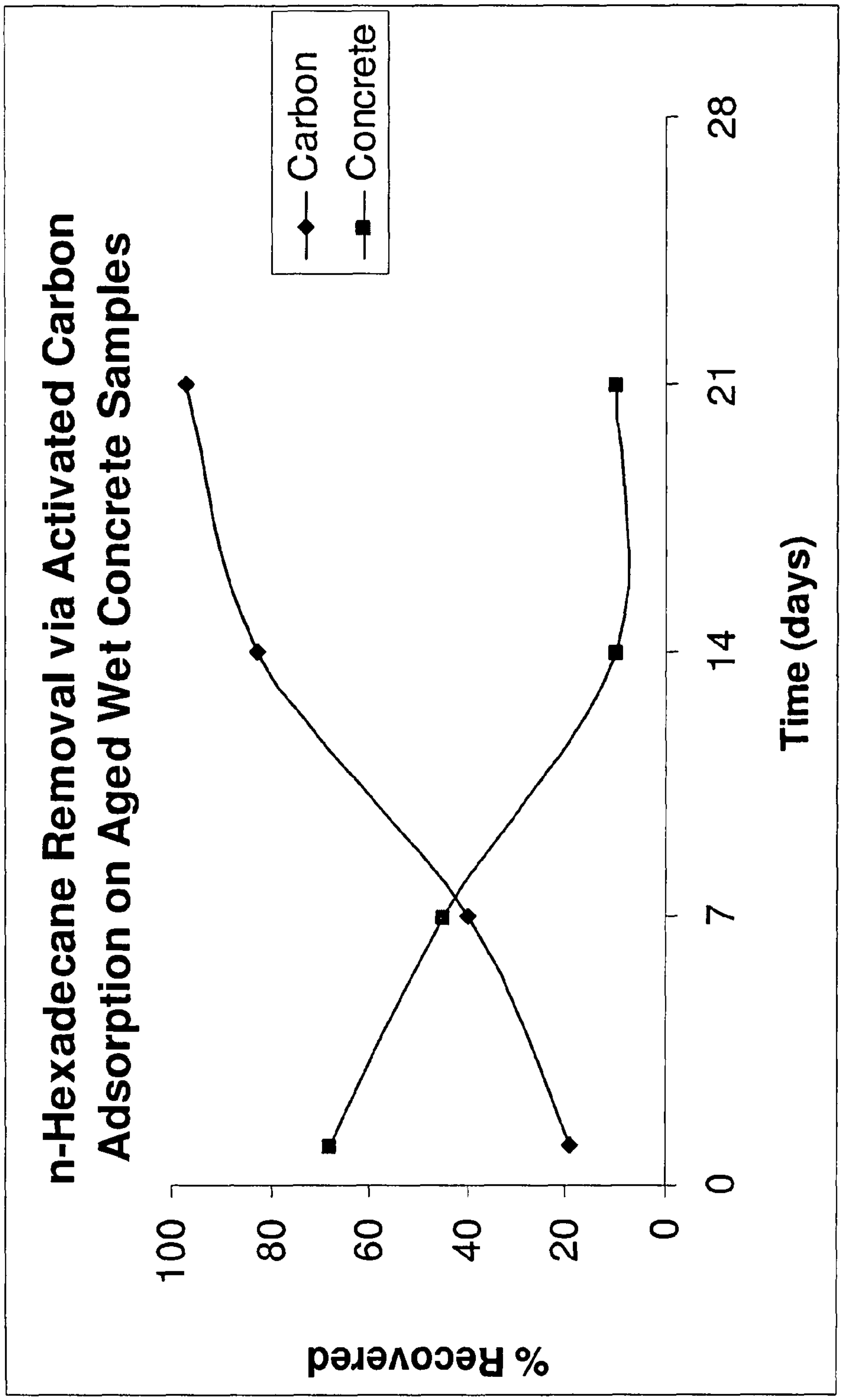
FIG. 3 summarizes the removal of $^{14}C$-labeled n-hexadecane from aged wet concrete samples by application of pre-heated activated carbon.

FIGS. 2 and 3 demonstrate the application of the improved adsorbent (pre-heated activated carbon) on the $^{14}C$-labeled hexadecane-contaminated concrete on fresh and aged wet samples, respectively. It shows that pre-heated activated carbon upon application removes the hydrocarbon quickly and efficiently even for the "worst-case scenario" contamination: aged and water-inundated samples. FIGS. 2 and 3 demonstrate that 80-90% removal of a pollutant from contaminated concrete materials was accomplished using this method. Aged wet concrete materials may require additional periods of treatment to achieve maximum removal of a pollutant.

EXAMPLE 4

DNT Removal via Activated Carbon Adsorption in Wet and Dry Wood Samples

Figure 4:
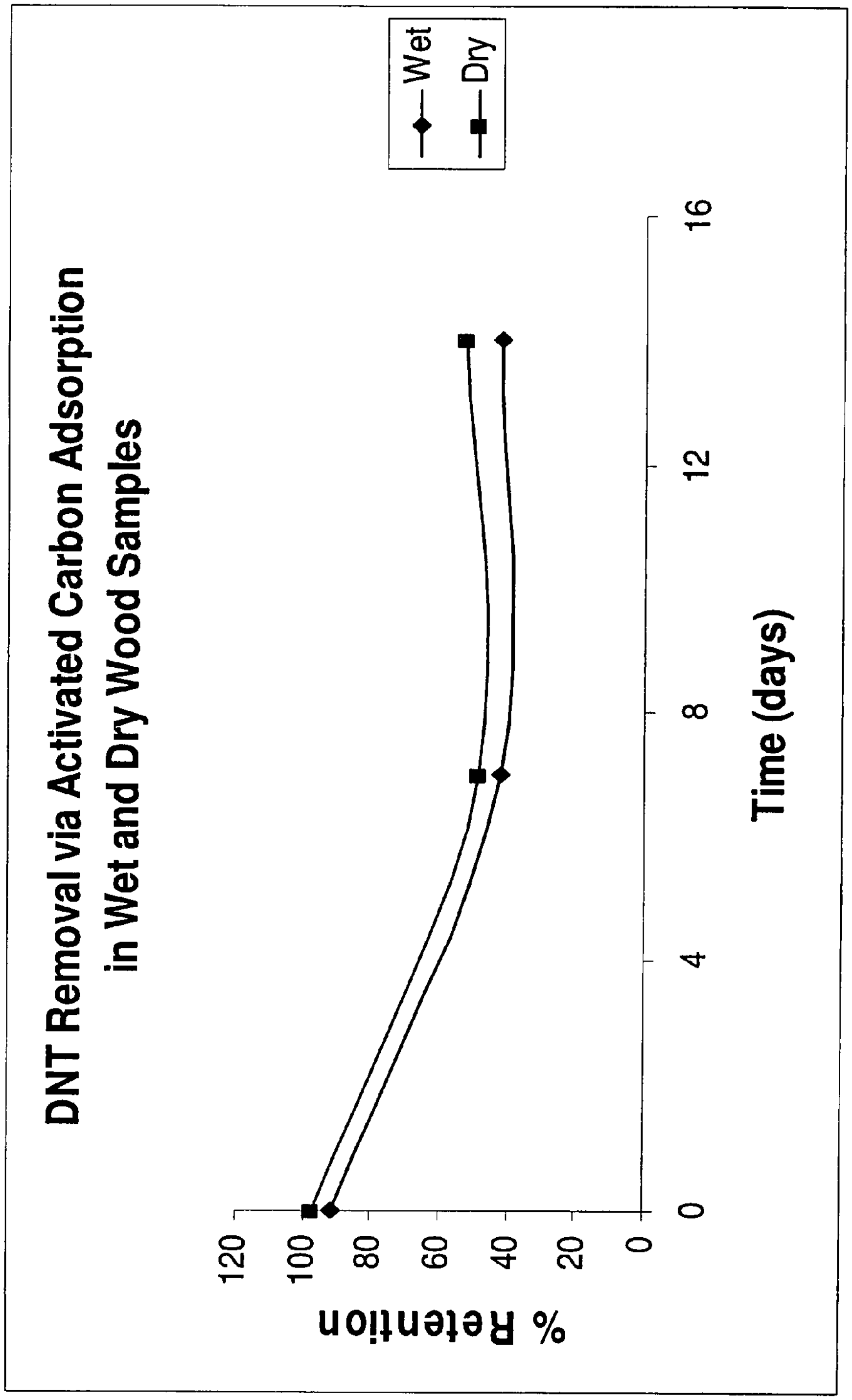
FIG. 4 summarizes the removal of $^{14}C$-labeled DNT from wood (southern yellow pine) by the application of pre-heated activated carbon.

FIG. 4 demonstrates the application of an improved adsorbent (pre-heated activated carbon) on the $^{14}C$-labeled DNT-contaminated wood. It was found that pre-heated activated carbon upon application removes this contaminant quickly, regardless of whether the sample is wet or dry, or aged or fresh. The pre-heated activated carbon quickly reduced the DNT concentration in the wood by significant amounts.

EXAMPLE 5

Pollutant/Moisture Removal via Adsorption as a Pre-Treatment

One of the problems with the removal of pollutants from porous materials is that they are mixed with water in pores forming so-called "ganglia." As a result, their diffusion toward the surface (i.e., the treatment site) is hindered. This is particularly pronounced for poorly water-soluble pollutants, such as hydrocarbons. Application of adsorbents as a pre-treatment (prior to the use of chemical, photo-chemical, or biological treatment of the contaminated material) contributes to solving this problem.

In our experiments, application of diatomaceous earth or activated carbon to both wood and concrete completely saturated with water (the details are given in the previous examples) resulted in the removal of 20-30% of water in 1 day, ca. 50-60% of water in 7 days, and up to 70% in 14-21 days. When activated carbon was used on n-hexadecane- or DNT-contaminated wood or concrete, the concomitant partial pollutant removal was also observed as described in the previous examples.

EXAMPLE 6

Pollutant/Moisture Removal via Adsorption as a Post-Treatment

One of the problems with the removal of pollutants from porous materials is that a sizable portion of the pollutant-remains inaccessible for the surface treatment (chemical, photo-chemical, or biological) because it is trapped within the pores and is inaccessible within the timeframe of the method used. The application of an adsorbent after such a treatment (to remove the residual pollutants) may significantly ameliorate this problem because the timeframe of this treatment is not limited.

EXAMPLE 7

Pollutant Removal via a Mixture of Activated Carbon and Either Photochemical or Biological Remediation Technologies Activated carbon is one substance that is capable of removing pollutants from porous, solid materials. Other methods remove pollutants by contacting microbial biomass onto the surface of contaminated porous, solid materials (U.S. Pat. No. 7,144,725). For example, naphthalene removal from concrete and n-hexadecane removal from concrete and wood served as model systems for studying the use of microbial biomass for removal of contamination in that invention.

In one embodiment of the present invention, a mixture of activated carbon and bacteria may be used to provide a greater reduction and/or faster removal rate of contaminants from porous, solid materials than activated carbon by itself.

*Pseudomonas aeruginosa* may be grown in a mineral medium at 30° C. Once growth slows, the cell concentration is adjusted to $(4\pm2)\times10^{10}$/mL. A mixture may be prepared containing activated carbon and bacteria where activated carbon is about 40% to 99% of the total final weight and the remaining amount is biomass that contains up to 5% agar. The resulting mixture may be loaded onto a support, and then applied to contaminated wood and concrete. Environmental conditions may be maintained so that the ambient temperature stays between 5° C. and 40° C. The moisture level of the biomass should be sufficient to sustain active degradation of the pollutant and the nutrient levels should be adequate to sustain active degradation of the pollutant. The biomass overlays may remain in contact with the contaminated wood and concrete until a sufficient amount of pollutant is removed, which may be for a period of up to 1-2 months.

A second method, described previously, removed pollutants by contacting a photocatalyst onto the surface of a contaminated solid substance (U.S. Patent Publication No. 2006/0207870). This invention discussed a method of using a photocatalyst, specifically titanium dioxide ($TiO_2$), to accelerate the reduction in the concentration of one or more semi-volatile organic chemicals from porous, solid materials using a photocatalyst and a light source.

In one embodiment of the present invention, DNT and n-hexadecane may be used as model systems to assess the efficiency and effectiveness of their removal from concrete and wood. $TiO_2$ may be mixed with activated carbon, where activated carbon is about 40% to 99% of the total final weight. Next, a desired amount of the activated carbon/$TiO_2$ mixture may be mixed with water in a 1:1 volume-to-volume ratio to form a paste. The paste may then be loaded onto contaminated samples of wood or concrete. To activate the photocatalyst the application is subjected to continuous exposure of light within the range of 150 nanometers to 350 nanometers. The activated carbon/$TiO_2$ paste may remain in contact with contaminated wood and concrete until a sufficient amount of contaminant is removed, which may be for a period of approximately 1-3 weeks or less.

In yet another embodiment, the activated carbon/bacteria or activated carbon/photocatalyst may be stored separately to ensure the remedial effects of the activated carbon, bacteria, and/or photocatalyst are not compromised.

EXAMPLE 8

Contaminant Removal of the Activated Carbon Surface

While activated carbon has proven to be very effective in the removal of contaminants from the pores of porous, solid materials, it does not destroy the contaminant. A potentially dangerous contaminant adhering to the surface of the activated carbon gives rise to two issues: 1) the activated carbon is no longer usable and 2) the activated carbon is now considered a waste product.

In one embodiment of the present invention, a mixture of contaminated activated carbon and bacteria may be combined to remove the adsorbed contaminants from the surface of the activated carbon.

*Pseudomonas aeruginosa* may be grown in a mineral medium at 30° C. Once growth slows, the cell concentration is adjusted to $(4\pm2)\times10^{10}$/mL. A mixture may be prepared containing contaminated activated carbon and bacteria where the contaminated activated carbon is about 40% to 99% of the total final weight and the remaining amount is biomass. Environmental conditions may be maintained so that the ambient temperature stays between 5° C. and 40° C. The moisture level of the biomass should be sufficient to sustain active degradation of the pollutant and the nutrient levels should be adequate to sustain active degradation of the pollutant. The biomass overlays may remain in contact with the contaminated activated carbon until a sufficient amount of contaminant is removed, which may be for a period of up to 1-2 months. This process may ensure the activated carbon is clean and does not need to be treated as waste, and also may render the activated carbon reusable.

In another embodiment of the invention, $TiO_2$ may be mixed with contaminated activated carbon, where the contaminated activated carbon is about 40% to 99% of the total final weight. Next, a desired amount of the activated carbon/$TiO_2$ mixture may be mixed with water in a 1:1 volume-to-volume ratio to form a paste. To activate the $TiO_2$ photocatalyst, the paste is subjected to continuous exposure of light within the range of 150 nanometers to 350 nanometers. The $TiO_2$ may remain in contact with contaminated activated carbon until a sufficient amount of contaminant is removed, which may be for a period of 1-3 weeks or less. This may ensure the activated carbon is clean and does not need to be treated as waste, and also may render the activated carbon reusable.

Although the present invention has been described with reference to preferred embodiments, workers skilled in the art will recognize that changes may be made in form and detail without departing from the spirit and scope of the invention.

The invention claimed is:

1. A method of accelerating reduction of a concentration of a semivolatile organic chemical from a porous, solid building material of a building that has been subjected to contamination, the method comprising:

applying a layer of an adsorbent material, the layer comprising at least 45% activated carbon, on a surface of the porous, solid building material to enable diffusion of a semivolatile organic chemical from interior pores of the porous, solid building material towards the surface of the porous, solid building material;

allowing adsorption of the semivolatile organic chemical to the adsorbent material for at least about six hours; and removing the adsorbent material containing an adsorbed semivolatile organic chemical from the surface of the porous, solid building material.

2. The method of claim 1, wherein adsorption occurs for at least about twelve hours.

3. The method of claim 1, wherein the layer of adsorbent material has no photocatalytic properties.

4. The method of claim 1, wherein the adsorbent material is heated before applying to the surface of the porous, solid material.

5. The method of claim 1, wherein ambient temperature during adsorption is between about 5° C. and about 40° C.

6. The method of claim 1, further comprising:

applying a second quantity of adsorbent material comprising at least 45% activated carbon different from a first application on the surface of the porous, solid building material;

allowing adsorption of the semivolatile organic chemical to the second quantity of adsorbent material; and removing the second quantity of adsorbent material from the surface of the porous, solid building material.

7. The method of claim 1, wherein the semivolatile organic chemical is selected from a group consisting essentially of fuel oil, diesel, kerosene hydrocarbons, oxygenated compounds, polychlorobiphenyls, halogenated compounds, nitrocompounds, and any combinations thereof.

8. The method of claim 1, wherein the porous, solid material is selected from a group consisting essentially of concrete, wood, lumber, gypsum, brick, masonry, asphalt, cement, cinder, tile, drywall, and any combinations thereof.

9. The method of claim 1, further comprising:

applying a photocatalyst to the adsorbent material; and exposing the photocatalyst to a light source.

10. The method of claim 9, wherein the photocatalyst is selected from the group consisting of titanium dioxide, vanadium dioxide, $La_2Ti_2O_7$, Tinolux BBS, and combinations thereof.

11. The method of claim 9, wherein the light source is chosen from a group consisting of fluorescent light, ultraviolet light, natural light and combinations thereof.

12. The method of claim 9, wherein the photocatalyst is applied to the adsorbent material by mixing the photocatalyst and adsorbent material prior to application on the surface of the porous, solid material.

13. The method of claim 9, wherein the photocatalyst is applied to the adsorbent material at a time different from application of the adsorbent material on the surface of the porous, solid material.

* * * * *